(12) United States Patent
Saigusa et al.

(10) Patent No.: US 8,865,304 B2
(45) Date of Patent: Oct. 21, 2014

(54) BIODEGRADABLE ALIPHATIC POLYESTER PARTICLES AND PRODUCTION PROCESS THEREOF

(75) Inventors: Kotaku Saigusa, Toyko (JP); Masahiro Yamazaki, Tokyo (JP); Shunsuke Abe, Tokyo (JP); Nanako Kuruhara, Tokyo (JP); Hiroyuki Sato, Toyko (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 13/452,119

(22) Filed: Apr. 20, 2012

(65) Prior Publication Data

US 2012/0270048 A1    Oct. 25, 2012

(30) Foreign Application Priority Data

Apr. 22, 2011   (JP) ................. 2011-095831

(51) Int. Cl.
*C08G 63/06* (2006.01)
*C08G 63/88* (2006.01)
*C08G 63/08* (2006.01)

(52) U.S. Cl.
CPC ............... *C08G 63/08* (2013.01); *C08G 63/88* (2013.01)
USPC ........................... 428/402; 428/403; 521/182

(58) Field of Classification Search
None
See application file for complete search history.

(56) References Cited

U.S. PATENT DOCUMENTS

| 4,471,077 | A | 9/1984 | Lange |
| 5,646,238 | A | 7/1997 | Ikeda et al. |
| 6,190,773 | B1 * | 2/2001 | Imamura et al. ............. 428/402 |
| 2003/0176633 | A1 * | 9/2003 | Noda et al. ................... 528/480 |

FOREIGN PATENT DOCUMENTS

| JP | 08-120060 A | 5/1996 |
| JP | 8-311368 | 11/1996 |
| JP | 2001-288273 | 10/2001 |
| JP | 2005-126490 A | 5/2005 |
| JP | 2005-520901 A | 7/2005 |
| JP | 2006-45542 | 2/2006 |
| JP | 2007-231154 A | 9/2007 |
| JP | 2008-120878 A | 5/2008 |
| JP | 2010-175841 A | 12/2010 |

OTHER PUBLICATIONS

English Translation of JP 2007-197602, Fujimoto et al., Aug. 2007.*
Official Action dated Aug. 19, 2014 from corresponding Japanese application 2011-095831.

* cited by examiner

*Primary Examiner* — Ronak Patel
(74) *Attorney, Agent, or Firm* — Porter Wright Morris & Arthur LLP

(57) ABSTRACT

Biodegradable aliphatic polyester particles have: (A) an average particle diameter of 10 to 500 μm, and (B) a quantity of heat of low-temperature crystallization calculated as an exotherm attending on crystallization, detected in the course of heating by DSC, of at least 1 J/g, and preferably: (C) a quantity of heat of crystal melting calculated as an endotherm attending on melting of a crystal, detected in the course of the heating, of less than 100 J/g, and (D) a difference between the quantity of heat of crystal melting and the quantity of heat of low-temperature crystallization of less than 90 J/g. A process for producing the particles comprises grinding a particular biodegradable aliphatic polyester having a weight average molecular weight of at least 50,000 at not lower than 0° C. and lower than the glass transition temperature of the polyester while applying high shearing force.

16 Claims, No Drawings

BIODEGRADABLE ALIPHATIC POLYESTER PARTICLES AND PRODUCTION PROCESS THEREOF

TECHNICAL FIELD

The present invention relates to biodegradable aliphatic polyester particles soluble in an organic solvent under an environment of a low temperature such as ordinary temperature and a production process thereof.

BACKGROUND ART

Since aliphatic polyesters such as polyglycolic acid and polylactic acid are degraded by microorganisms or enzymes present in the natural world such as soil and sea, they attract attention as biodegradable polymeric materials which impose little burden on the environment. These biodegradable aliphatic polyesters are also utilized as medical polymeric materials for surgical sutures, artificial skins, etc. because they have degradability and absorbability in vivo.

As the biodegradable aliphatic polyesters, are known polyglycolic acid (hereinafter may referred to as "PGA") composed of a repeating unit of glycolic acid, polylactic acid (hereinafter may referred to as "PLA") composed of a repeating unit of lactic acid, lactone-based polyesters such as poly-$\epsilon$-caprolactone, polyhydroxybutyrate-based polyesters and copolymers thereof, for example, copolymers composed of a repeating unit of glycolic acid and a repeating unit of lactic acid.

Among the biodegradable aliphatic polyesters, PLA has such features that L-lactic acid which becomes a raw material is cheaply obtained from corn, root vegetables and the like by a fermentation process, the total amount of carbon dioxide emissions is small because it is derived from natural agricultural products, and it is strong in rigidity and good in transparency as the performance of the resultant poly-L-lactic acid.

On the other hand, PGA is excellent in heat resistance and mechanical strength such as tensile strength and also excellent in gas barrier properties when formed into a film or sheet in particular in addition to high degradability. Therefore, PGA is expected to be used as agricultural materials, various packaging (container) materials and medical polymeric materials, and so its new uses are developed either singly or in the form of a composite with other resin materials.

As methods for producing a product from a biodegradable aliphatic polyester, are adopted melt forming or molding methods and other methods such as extrusion, injection molding, compression molding, injection compression molding, transfer molding, cast molding, stampable molding, blow molding, stretch film forming, inflation film forming, laminate molding, calendering, foam extrusion, RIM, FRP molding, powder molding, paste molding and flow cast molding (casting).

The melt forming or molding is a forming or molding method that a composition containing the biodegradable aliphatic polyester and additives blended as needed is used as a raw material for forming or molding, and this composition is heated and melted and then formed into a predetermined shape. Pellets of the biodegradable aliphatic polyester such as PGA used as the raw material for forming or molding are those obtained by melt-extruding the biodegradable aliphatic polyester such as PGA into a strand by means of, for example, a twin-screw extruder and cutting the strand into a desired size and having an average particle size of about several millimeters.

The powder molding or paste molding is a molding method that powder or particles of the biodegradable aliphatic polyester such as PGA are applied to a mold as it is or as a dispersion liquid dispersed in a solvent and formed into a shape conforming to the mold generally under heating. As the powder or particles of the biodegradable aliphatic polyester used, are used particles prepared in predetermined size and shape according to use.

The flow cast molding (hereinafter may referred to as "casting" or "cast molding") is a method that a solution obtained by dissolving a composition containing the biodegradable aliphatic polyester such as PGA or PLA and additives blended as needed in a solvent is cast on a drum (casting drum) the surface of which has been smoothed or a smoothed belt made of stainless steel to apply the solution thereto, and heating is then conducted as needed to evaporate or remove the solvent, thereby solidifying the biodegradable aliphatic polyester to produce a molded product in the form of often a film or sheet. The flow cast molding (casting) has such advantageous features that i) since no physical pressure is applied to the product in the form of, for example, a film, the product does not undergo orientation, and no directional property is produced in strength and optical properties, ii) thickness accuracy is extremely high, iii) the quantity of heat to be applied is small compared with the melt forming or molding method, and iv) the amount of a heat stabilizer or the like to be added can be reduced.

The biodegradable aliphatic polyester such as PGA or PLA attracts attention to the degradability, strength, etc. thereof and is expected to be used as a raw material, an additive or the like in fields of paints, coating materials, inks, toners, agricultural chemicals, medicines, cosmetics, mining, boring, etc. The biodegradable aliphatic polyester applied to these fields is used in the form of a dispersion liquid obtained by dispersing particles of the biodegradable aliphatic polyester in a solvent or in the form of a solution obtained by dissolving the biodegradable aliphatic polyester in a solvent.

In order to apply the biodegradable aliphatic polyester such as PGA or PLA to the flow cast molding (casting) or the fields of paints, coating materials and the like, the biodegradable aliphatic polyester is required to be easily dissolved in a solvent to form a uniform solution.

However, the biodegradable aliphatic polyester such as PGA or PLA is generally crystallized and high in crystallinity, so that it has been difficult to dissolve it in an organic solvent under an environment of a low temperature such as ordinary temperature. For example, Japanese Patent Application Laid-Open No. 58-206637 (Patent Literature 1) discloses that polylactide is dissolved in xylol by heating it to boiling. Japanese Patent Application Laid-Open No. 2006-45542 (Patent Literature 2) discloses that PLA is dissolved in a mixture [DBE (trademark)] of dimethyl adipate, dimethyl glutarate and dimethyl succinate at a temperature of 140° C., and that PGA is dissolved in bis(2-methoxyethyl)ether at a temperature of 150° C. In order to dissolve the biodegradable aliphatic polyester in a solvent at a high temperature, it is necessary to supply a great amount of thermal energy, and there is a possibility that hydrolysis or thermolysis may be caused because an excess of thermal history is applied to the biodegradable aliphatic polyester. Japanese Patent Application Laid-Open No. 8-311368 (Patent Literature 3) discloses that a biodegradable polymer having a number average molecular weight of at most 15,000, preferably 2,000 to 10,000 is dissolved in a non-halogen solvent together with a crosslinking agent and a crosslinking catalyst, and a crosslinking reaction is then conducted under heating, thereby obtaining a biodegradable coating film. However, application fields thereof are limited because it is a low-molecular weight biodegradable polymer including an oligomer, and the crosslinking reaction is followed.

There is thus a demand for development of a biodegradable aliphatic polyester such as PLA or PGA, which can be dissolved in an organic solvent under an environment of a low temperature such as ordinary temperature.

On the other hand, the biodegradable aliphatic polyester such as PGA or PLA is generally stored or shipped in the form of particles of the biodegradable aliphatic polyester at the stage of distribution. Thereafter, the particles are formed or molded according to various forming or molding methods suitable for an intended formed or molded product or submitted for appointed uses through the form of a dispersion liquid or solution of the particles.

A production process of resin particles of the biodegradable aliphatic polyester such as PLA particles or PGA particles is variously proposed.

As a production process of the biodegradable aliphatic polyester particles, are generally known a production process of particles by cutting or grinding of a melted and solidified product, and a production process of particles by deposition from a solution or dispersion liquid. Japanese Patent Application Laid-Open No. 2001-288273 (Patent Literature 4) discloses a production process of polylactic acid-based resin powder, in which chips or a massive product composed of a PLA resin is refrigerated to a low temperature of −50 to −180° C., impact-ground and classified. Japanese Patent Application Laid-Open No. 2006-45542 (Patent Literature 2) mentioned above discloses that a solution of PGA or PLA is quickly cooled at a cooling rate of at least 20° C./min to obtain particles having an average primary particle diameter of 10 to 1,000 nm.

However, these processes are difficult to industrially provide particles of the biodegradable aliphatic polyester such as PGA or PLA, which are soluble in an organic solvent under a low-temperature environment, and there is thus a demand for development of a process for industrially producing particles of the biodegradable aliphatic polyester such as PGA or PLA, which are soluble in an organic solvent under an environment of a low temperature such as ordinary temperature.

CITATION LIST

Patent Literature

Patent Literature 1: Japanese Patent Application Laid-Open No. 58-206637
Patent Literature 2: Japanese Patent Application Laid-Open No. 2006-45542
Patent Literature 3: Japanese Patent Application Laid-Open No. 8-311368
Patent Literature 4: Japanese Patent Application Laid-Open No. 2001-288273

SUMMARY OF INVENTION

Technical Problem

It is an object of the present invention to provide biodegradable aliphatic polyester particles soluble in an organic solvent under an environment of a low temperature such as ordinary temperature and a production process thereof.

Solution to Problem

The present inventors have carried out an investigation on crystal properties of the biodegradable aliphatic polyester particles in the course of an extensive research for the purpose of achieving the above object. As a result, it has been found that the presence of a non-crystalline portion of the particles relates to their solubility in a solvent, and that the degree of the non-crystalline portion of the particles is controlled, whereby the object can be achieved, thus leading to completion of the present invention.

According to the present invention, there is thus provided biodegradable aliphatic polyester particles having the following properties: (A) the average particle diameter thereof is 10 to 500 μm, and (B) the quantity of heat of low-temperature crystallization thereof as calculated out as an exotherm attending on crystallization, which is detected in the course of heating by a differential scanning calorimeter, is at least 1 J/g.

According to the present invention, there are also provided biodegradable aliphatic polyester particles shown by the following (1) to (3) as embodiments.

(1) The biodegradable aliphatic polyester particles, wherein (C) the quantity of heat of crystal melting thereof as calculated out as an endotherm attending on melting of a crystal, which is detected in the course of heating by the differential scanning calorimeter, is less than 100 J/g.

(2) The biodegradable aliphatic polyester particles, wherein (D) a difference between the quantity of heat of crystal melting and the quantity of heat of low-temperature crystallization is less than 90 J/g.

(3) The biodegradable aliphatic polyester particles, wherein a biodegradable aliphatic polyester contained in the biodegradable aliphatic polyester particles is PGA, PLA or a mixture thereof.

According to the present invention, there is further provided a process for producing the biodegradable aliphatic polyester particles, which comprises grinding a particular biodegradable aliphatic polyester having a weight average molecular weight of at least 50,000 at a temperature not lower than 0° C. and lower than the glass transition temperature of the biodegradable aliphatic polyester while applying high shearing force. Incidentally, the term "particular" as used herein means various forms such as powder, flake, particle and pellet that the biodegradable aliphatic polyester may generally have.

Advantageous Effects of Invention

The present invention exhibits effects that the biodegradable aliphatic polyester particles according to the present invention are biodegradable aliphatic polyester particles having the following properties: (A) the average particle diameter thereof is 10 to 500 μm, and (B) the quantity of heat of low-temperature crystallization thereof as calculated out as an exotherm attending on crystallization, which is detected in the course of heating by a differential scanning calorimeter, is at least 1 J/g, and preferably also having the following properties: (C) the quantity of heat of crystal melting thereof as calculated out as an endotherm attending on melting of a crystal, which is detected in the course of heating by the differential scanning calorimeter, is less than 100 J/g, and further (D) a difference between the quantity of heat of crystal melting and the quantity of heat of low-temperature crystallization is less than 90 J/g, whereby biodegradable aliphatic polyester particles which can be dissolved in an organic solvent at a temperature not higher than (the glass transition temperature of the biodegradable aliphatic polyester−5° C.), i.e., a temperature near ordinary temperature, and were good in handleability are provided.

The present invention also exhibit an effect that the above-described biodegradable aliphatic polyester particles can be easily obtained by grinding a particular biodegradable aliphatic polyester having a weight average molecular weight of at least 50,000 at a temperature not lower than 0° C. and lower than the glass transition temperature of the biodegradable aliphatic polyester while applying high shearing force.

DESCRIPTION OF EMBODIMENTS

1. Biodegradable Aliphatic Polyester

Examples of a biodegradable aliphatic polyester forming the biodegradable aliphatic polyester particles according to the present invention include homopolymers and copolymers of glycolic acids including glycolic acid and glycolide (GL) that is a bimolecular cyclic ester of glycolic acid; lactic acids including lactic acid and lactide that is a bimolecular cyclic ester of lactic acid; cyclic monomers such as ethylene oxalate (i.e., 1,4-dioxane-2,3-dione), lactones (for example, β-propiolactone, β-butyrolactone, pivalolactone, γ-butyrolactone, δ-valerolactone, β-methyl-δ-valerolactone and ε-caprolactone), carbonates (for example, trimethylene carbonate), ethers (for example, 1,3-dioxane) and ether esters (for example, dioxanone); hydroxycarboxylic acids such as 3-hydroxypropanoic acid, 4-hydroxybutanoic acid and 6-hydroxycaproic acid, and alkyl esters thereof; and aliphatic ester monomers such as substantially equimolar mixtures of an aliphatic diol such as ethylene glycol or 1,4-butanediol and an aliphatic dicarboxylic acid such as succinic acid or adipic acid or an alkyl ester thereof. Among others, a biodegradable aliphatic polyester containing a repeating unit derived from glycolic acid or lactic acid and represented by the formula: [—O—CH(R)—C(O)—] (R being a hydrogen atom or a methyl group) at a proportion of 70% by mass or more is preferred. Specifically, PGA, i.e. a homopolymer of glycolic acid, a copolymer containing a repeating unit derived from glycolic acid at a proportion of 70% by mass or more, PLA such as poly-L-lactic acid, poly-D-lactic acid, a copolymer containing a repeating unit derived from L-lactic acid or D-lactic acid at a proportion of 70% by mass or more or a mixture thereof, or a mixture of PGA and PLA is preferred. PGA or PLA is particularly preferred from the viewpoints of degradability, heat resistance and mechanical strength.

These biodegradable aliphatic polyesters can be synthesized by, for example, dehydration polycondensation of a α-hydroxycarboxylic acid such as glycolic acid or lactic acid, which is publicly known. In addition, a process in which a bimolecular cyclic ester of an α-hydroxycarboxylic acid is synthesized, and the cyclic ester is subjected to ring-opening polymerization is adopted for efficiently synthesizing a high-molecular weight biodegradable aliphatic polyester. For example, when lactide that is a bimolecular cyclic ester of lactic acid is subjected to ring-opening polymerization, PLA is obtained. When glycolide that is a bimolecular cyclic ester of glycolic acid is subjected to ring-opening polymerization, PGA is obtained.

PLA can be synthesized by the above-described process, and, for example, "LACEA" (trademark) series such as LACEA: H-100, H-280, H-400 and H-440 (products of Mitsui Chemicals, Inc.), "INGEO" (trademark): 3001D, 3051D, 4032D, 4042D, 6201D, 6251D, 7000D and 7032D (products of Nature Works LLC), "Eco Plastic U' z series" such as Eco Plastic U' z: S-09, S-12 and S-17 (products of Toyota Motor Corporation), and "VYLOECOL (trademark)" (product of TOYOBO CO., LTD.) are preferably selected as commercially available products from the viewpoints of reconciliation of strength and flexibility, and heat resistance.

The biodegradable aliphatic polyester will hereinafter be described in more detail taking PGA as an example. Even in PLA and other biodegradable aliphatic polyesters, however, the mode for carrying out the invention may be taken conforming to the PGA.

Polyglycolic Acid (PGA):

PGA particularly preferably used as a raw material for the biodegradable aliphatic polyester particles according to the present invention includes not only a glycolic acid homopolymer [including a ring-opening polymer of glycolide (GL) that is a bimolecular cyclic ester of glycolic acid] composed of only a repeating unit derived from glycolic acid and represented by the formula: [—O—$CH_2$—C(O)—] but also PGA copolymers containing the above repeating unit at a proportion of 50% by mass or more.

As examples of comonomers for providing the PGA copolymers with the glycolic acid monomer such as glycolide, may be mentioned cyclic monomers such as ethylene oxalate (i.e., 1,4-dioxane-2,3-dione), lactides, lactones, carbonates, ethers, ether esters and amides; hydroxycarboxylic acids such as lactic acid, 3-hydroxypropanoic acid, 3-hydroxybutanoic acid, 4-hydroxybutanoic acid and 6-hydroxycaproic acid, and alkyl esters thereof; substantially equimolar mixtures of an aliphatic diol such as ethylene glycol or 1,4-butanediol and an aliphatic dicarboxylic acid such as succinic acid or adipic acid or an alkyl ester thereof; and mixtures of two or more compounds thereof. Polymers of these comonomers may also be used as starting materials for providing the PGA copolymers with the glycolic acid monomer such as glycolide.

The content of the repeating unit derived from glycolic acid in PGA that becomes a raw material for the PGA particles according to the present invention is 50% by mass or more, preferably 70% by mass or more, more preferably 85% by mass, still more preferably 95% by mass or more, particularly preferably 98% by mass or more, most preferably 99% by mass or more that PGA substantially becomes a PGA homopolymer. If the content of the repeating unit derived from glycolic acid is too low, the strength and degradability expected of PGA become poor. Another repeating unit than the repeating unit derived from glycolic acid is used in a proportion of 50% by mass or less, preferably 30% by mass or less, more preferably 15% by mass or less, still more preferably 5% by mass or less, particularly preferably 2% by mass or less, most preferably 1% by mass or less and may not be contained.

PGA that becomes a raw material for the PGA particles according to the present invention is preferably PGA obtained by polymerizing 50 to 100% by mass of glycolide and 50 to 0% by mass of the other comonomers described above in order to efficiently produce a desired high-molecular weight polymer. The other comonomer may be either a bimolecular cyclic monomer or a mixture of the above-mentioned other comonomers than the cyclic monomer. However, the cyclic monomer is preferred for the purpose of providing the PGA particles at which the present invention aims. PGA obtained by subjecting 50 to 100% by mass of glycolide and 50 to 0% by mass of the other cyclic monomer to ring-opening polymerization will hereinafter be described in detail.

Glycolide:

The glycolide forming PGA by ring-opening polymerization is a bimolecular cyclic ester of glycolic acid that is a hydroxycarboxylic acid. No particular limitation is imposed on the production process of the glycolide. However, the glycolide can be generally produced by thermal depolymerization of a glycolic acid oligomer. As a depolymerization process of the glycolic acid oligomer, may be adopted, for example, a melt depolymerization process, a solid-phase depolymerization process or a solution-phase depolymerization process. Glycolide obtained as a cyclic condensate of a chloroacetic acid salt may also be used. Incidentally, that containing glycolic acid may be used as glycolide with the amount thereof limited to 20% by mass or less based on glycolide.

PGA that becomes a raw material for the PGA particles according to the present invention may be formed by subjecting only glycolide to ring-opening polymerization. However, a copolymer may also be formed by subjecting another cyclic monomer as a copolymerization component to ring-opening polymerization together with glycolide. When the copolymer is formed, the proportion of glycolide is 50% by mass or more, preferably 70% by mass or more, more preferably 85% by mass or more, still more preferably 95% by mass or more, particularly preferably 98% by mass or more, most preferably 99% by mass or more that PGA substantially becomes a PGA homopolymer.

Another Cyclic Monomer:

As another cyclic monomer usable as a copolymerization component together with glycolide, a cyclic monomer such as a lactone (for example, β-propiolactone, β-butyrolactone, pivalolactone, γ-butyrolactone, δ-valerolactone, β-methyl-δ-valerolactone or ε-caprolactone), trimethylene carbonate or 1,3-dioxane may be used in addition to a bimolecular cyclic ester of another hydroxycarboxylic acid, such as lactide. Preferred another cyclic monomer is a bimolecular cyclic ester of a hydroxycarboxylic acid, and as examples of the hydroxycarboxylic acid, may be mentioned L-lactic acid, D-lactic acid, α-hydroxybutyric acid, α-hydroxyisobutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid, α-hydroxystearic acid and alkyl-substituted products thereof. Lactide that is a bimolecular cyclic ester of lactic acid is particularly preferred as another cyclic monomer and may be any of an L-form, a D-form, a racemic modification or a mixture thereof.

Another cyclic monomer is used in a proportion of 50% by mass or less, preferably 30% by mass or less, more preferably 15% by mass or less, still more preferably 5% by mass or less, particularly preferably 2% by mass or less, most preferably 1% by mass or less. Glycolide and another cyclic monomer are subjected to ring-opening polymerization, whereby the melting point of the resulting PGA (copolymer) can be lowered to lower the processing temperature thereof, the crystallization speed thereof can be controlled to improve the extrusion processing ability and stretch processing ability thereof. However, if the proportion of another cyclic monomer used is too great, the crystallinity of the resulting PGA (copolymer) is impaired, and the heat resistance, gas barrier properties, mechanical strength, etc. thereof are deteriorated. Incidentally, when PGA is formed from 100% by mass of glycolide, the proportion of another cyclic monomer is 0% by mass, and this PGA is also included in the scope of the present invention.

Ring-Opening Polymerization Reaction:

The ring-opening polymerization or ring-opening copolymerization [hereinafter may be generally called "ring-opening (co)polymerization"] of glycolide is preferably performed in the presence of a small amount of a catalyst. No particular limitation is imposed on the catalyst. However, examples thereof include tin compounds such as tin halides (for example, tin dichloride and tin tetrachloride) and tin organic carboxylates (for example, tin octanoates such as tin 2-ethylhexanoate); titanium compounds such as alkoxytitanates; aluminum compounds such as alkoxyaluminum; zirconium compounds such as zirconium acetylacetone; and antimony compounds such as antimony halides and antimony oxide. The amount of the catalyst used is preferably about 1 to 1,000 ppm, more preferably about 3 to 300 ppm in terms of a mass ratio to the cyclic ester.

In the ring-opening (co)polymerization of glycolide, a protic compound such as a higher alcohol such as lauryl alcohol, another alcohol or water may be used as a molecular weight modifier for the purpose of controlling the molecular weight and physical properties such as melt viscosity of the resulting PGA. Glycolide may generally contain a trace amount of water and hydroxycarboxylic acid compounds composed of glycolic acid and linear glycolic acid oligomers as impurities in some cases, and these compounds also act on a polymerization reaction. Therefore, the amount of these impurities, for example, the amount of the carboxylic acids in the these compounds is determined as a molar concentration by neutralization titration or the like, and an alcohol and/or water is added as a protic compound according to the intended molecular weight to control the molar concentration of the whole protic compound to glycolide, whereby the molecular weight and the like of the resulting PGA can be controlled. In addition, a polyhydric alcohol such as glycerol may also be added for the purpose of improving the physical properties of the resulting PGA.

The ring-opening (co)polymerization of glycolide may be conducted by either bulk polymerization or solution polymerization. In many cases, however, the bulk polymerization is adopted. A polymerizer for the bulk polymerization may be suitably selected from among various kinds of apparatus such as extruder type, vertical type having a paddle blade, vertical type having a helical ribbon blade, horizontal type such as an extruder type or kneader type, ampoule type, plate type and annular type. Various kinds of reaction vessels may be used for the solution polymerization.

The polymerization temperature can be suitably preset within a range of from 120° C., which is a substantial polymerization-initiating temperature, to 300° C. as necessary for the end application intended. The polymerization temperature is preferably 130 to 270° C., more preferably 140 to 260° C., particularly preferably 150 to 250° C. If the polymerization temperature is too low, PGA formed tends to have a wide molecular weight distribution. If the polymerization temperature is too high, PGA formed tends to undergo thermal decomposition. The polymerization time is within a range of from 3 minutes to 50 hours, preferably from 5 minutes to 30 hours. If the polymerization time is too short, it is hard to sufficiently advance the polymerization, and so a desired molecular weight cannot be realized. If the polymerization time is too long, PGA formed tends to be colored.

After the PGA formed is solidified, the PGA may be further subjected to solid-phase polymerization if desired. The solid-phase polymerization means an operation that the PGA is heated at a temperature lower than the melting point (Tm) of the PGA, which will be described subsequently, thereby subjecting the PGA to a heat treatment while retaining the solid state. A low-molecular weight component such as an unreacted monomer or an oligomer is evaporated and removed by this solid-phase polymerization. The solid-phase polymerization is conducted for preferably 1 to 100 hours, more preferably 2 to 50 hours, particularly preferably 3 to 30 hours.

The raw material for producing the PGA particles according to the present invention may contain, in addition to the PGA, another resin such as another aliphatic polyester, a polyglycol such as polyethylene glycol or polypropylene glycol, modified polyvinyl alcohol, polyurethane or a polyamide such as poly-L-lysine and additives which are generally incorporated, such as a plasticizer, an antioxidant, a light stabilizer, a heat stabilizer, an end-capping agent, an ultraviolet light absorber, a lubricant, a parting agent, a wax, a colorant, a crystallization accelerator, a hydrogen ion concentration modifier and an inorganic filler such as reinforcing fiber as needed. The amount of these additives incorporated is generally 30 parts by mass or less, preferably 20 parts by mass or less, more preferably 10 parts by mass or less per 100 parts by mass of the PGA. The amount incorporated may be 5 parts by mass or less or 1 part by mass or less in some cases.

Weight Average Molecular Weight (Mw):

The weight average molecular weight (Mw) of the PGA used for forming the PGA particles according to the present invention is at least 50,000 and selected from a range of preferably from 50,000 to 1,500,000, more preferably from 70,000 to 1,400,000, still more preferably from 80,000 to 1,300,000, particularly preferably from 100,000 to 1,200,000, most preferably from 150,000 to 1,000,000. The weight average molecular weight (Mw) of the PGA is value determined by means of a gel permeation chromatography (GPC) analyzer. Specifically, after a PGA sample is dissolved in a solution with sodium trifluoroacetate dissolved at a predetermined concentration in hexafluoroisopropanol (HFIP), the solution is filtered through a membrane filter to prepare a sample solution, this sample solution is injected into the gel permeation chromatography (GPC) analyzer to measure a molecular weight, and a weight average molecular weight (Mw) is calculated out from the result measured. If the weight average molecular weight (Mw) is less than 50,000, strength may be insufficient in some cases in various products and uses using the resulting PGA particles. No particular limitation is imposed on the upper limit of the weight average molecular weight (Mw), and the weight average molecular weight may be determined in a range within which a solution can be easily formed at a temperature near ordinary temperature, and the solution viscosity of the resulting solution does not become excessively high.

On the other hand, the weight average molecular weight (Mw) of the PLA used for forming the PLA particles according to the present invention is at least 50,000 and is within a range of preferably from 50,000 to 1,200,000, more preferably from 60,000 to 1,000,000, still more preferably from 70,000 to 800,000.

Crystalline Melting Point (Tm):

The crystalline melting point (Tm) of the PGA used for forming the PGA particles according to the present invention is generally 197 to 245° C. and may be controlled by, for example, the weight average molecular weight (Mw), a molecular weight distribution, and the kind and content of a copolymerization component. The crystalline melting point (Tm) of the PGA is preferably 200 to 240° C., more preferably 205 to 235° C., particularly preferably 210 to 230° C. The crystalline melting point (Tm) of a PGA homopolymer is generally about 220° C. If the crystalline melting point (Tm) is too low, strength and heat resistance may be insufficient in some cases in various products obtained by using the resulting PGA particles. If the crystalline melting point (Tm) is too high, it may be difficult in some cases to form a solution at a temperature near ordinary temperature, the processing ability of the resulting PGA particles may be insufficient, and it may be impossible to satisfactorily control the shape of the PGA particles, and so the PGA particles may fail to have a particle diameter within a desired range. The crystalline melting point (Tm) of the PGA is a value determined under a nitrogen atmosphere by means of a differential scanning calorimeter (DSC). Specifically, the crystalline melting point means a temperature of an endothermic peak attending on melting of a crystal, which is detected in the course of heating the sample from −50° C. to 280° C. [corresponding to a temperature near (the crystalline melting point (Tm)+60° C.)] at a heating rate of 20° C./min under a nitrogen atmosphere. When a plurality of endothermic peaks is observed, a temperature of a peak having the largest peak area is regarded as a crystalline melting point (Tm).

On the other hand, the crystalline melting point (Tm) of the PLA used for forming the PLA particles according to the present invention is within a range of preferably from 145 to 185° C., more preferably from 150 to 182° C., still more preferably from 155 to 180° C.

Glass Transition Temperature (Tg):

The glass transition temperature (Tg) of the PGA used for forming the PGA particles according to the present invention is generally 25 to 60° C., preferably 30 to 50° C., more preferably 35 to 45° C. The glass transition temperature (Tg) of the PGA may be controlled by, for example, the weight average molecular weight (Mw), a molecular weight distribution, and the kind and content of a copolymerization component. The glass transition temperature (Tg) of the PGA is a value determined under the nitrogen atmosphere by means of the differential scanning calorimeter (DSC) like the measurement of the crystalline melting point (Tm). Specifically, an intermediate point between a start temperature and an end temperature in transition from a glassy state to a rubbery state when a non-crystalline sample obtained by heating a PGA sample to about 280° C. [near (the crystalline melting point (Tm)+60° C.)], holding the sample for 2 minutes at this temperature and then quickly (at a rate of about 100° C./min) cooling the sample with liquid nitrogen is reheated from a temperature near room temperature to a temperature near 100° C. at a heating rate of 20° C./min under the nitrogen atmosphere by means of the DSC is regarded as a glass transition temperature (Tg) (hereinafter may be referred to as "intermediate-point glass transition temperature"). If the glass transition temperature (Tg) is too low, strength and heat resistance are insufficient in various products obtained by using the resulting PGA particles. If the glass transition temperature (Tg) is too high on the other hand, it may be difficult in some cases to form a solution at a temperature near ordinary temperature, the processing ability of the resulting PGA particles may be insufficient, and it may be impossible to satisfactorily control the shape of the PGA particles, and so the PGA particles may fail to have a particle diameter within a desired range.

On the other hand, the glass transition temperature (Tg) of the PLA used for forming the PLA particles according to the present invention is within a range of preferably from 45 to 75° C., more preferably from 50 to 70° C., still more preferably from 55 to 65° C.

2. Biodegradable Aliphatic Polyester Particles

The biodegradable aliphatic polyester particles according to the present invention are particles comprising a biodegradable aliphatic polyester as a main component and are preferably PGA particles, PLA particles or mixed particles of PGA particles and PLA particles. The biodegradable aliphatic polyester particles will hereinafter be described in more detail taking PGA particles as an example. Even in PLA particles or mixed particles of PGA particles, PLA particles and particles of any other biodegradable aliphatic polyester, however, the mode for carrying out the invention may be taken conforming to the PGA particles.

The biodegradable aliphatic polyester particles according to the present invention are biodegradable aliphatic polyester particles having the following properties: (A) the average particle diameter thereof is 10 to 500 μm, and (B) the quantity of heat of low-temperature crystallization thereof as calculated out as an exotherm attending on crystallization, which is detected in the course of heating by a differential scanning calorimeter, is at least 1 J/g.

Average Particle Diameter (50% D):

The biodegradable aliphatic polyester particles such as the PGA particles according to the present invention have an average particle diameter (50% D) of 10 to 500 μm. The average particle diameter (50% D) of the particles means a value represented by a particle diameter that a cumulative weight from the side of the smallest particle diameter becomes 50% by means of a particle diameter distribution determined by using a laser diffraction type particle size distribution meter.

The average particle diameter (50% D) of the biodegradable aliphatic polyester particles according to the present invention is within a range of preferably from 12 to 450 μm, more preferably from 15 to 400 μm, still more preferably from 20 to 300 μm, particularly preferably from 30 to 200 μm. If the average particle diameter (50% D) is too small, the handleability, shelf stability and storage stability of such particles become poor. If the average particle diameter (50% D) is too large, it may be difficult in some cases to use such particle according to uses thereof. For example, when the average particle diameter is too large, the low-temperature solubility of such particles at a temperature near ordinary temperature may become poor in some cases.

Low-Temperature Crystallization Temperature ($T_{c1}$):

In the PGA particles according to the present invention, a low-temperature crystallization temperature ($T_{c1}$) according to an exothermic peak attending on crystallization, which is detected in the course of heating by a differential scanning calorimeter, is preferably at least (the glass transition temperature of the PGA+10° C.), more preferably at least (the glass transition temperature of the PGA+15° C.), still more preferably at least (the glass transition temperature of the PGA+20° C.). No particular limitation is imposed on the upper limit of the low-temperature crystallization temperature ($T_{c1}$). However, the upper limit is generally (the glass transition temperature of the PGA+65° C.), often (the glass transition temperature of the PGA+60° C.), and this temperature may also be taken as a limit. A specific range of the low-temperature crystallization temperature ($T_{c1}$) is preferably a range of, for example, from 55 to 110° C., and PGA particles having a low-temperature crystallization temperature ($T_{c1}$) within a range of particularly preferably from 60 to 105° C., most preferably from 65 to 100° C. may be selected. When an exothermic peak attending on crystallization is detected in the course of a heating process of quickly cooling a sample of the PGA particles with liquid nitrogen (at a cooling rate of about 20° C./min) and heating the sample from −50° C. to a temperature near (the crystalline melting point (Tm)+60° C.) at a heating rate of 20° C./min under a nitrogen atmosphere by means of a differential scanning calorimeter (DSC), the low-temperature crystallization temperature ($T_{c1}$) of the PGA particles means the temperature of that exothermic peak. If the low-temperature crystallization temperature ($T_{c1}$) is too low, the surfaces of such PGA particles are softened while the PGA particles are stored, and so blocking of the particles may be liable to occur in some cases. If the low-temperature crystallization temperature ($T_{c1}$) is too high, it may be difficult in some cases to form a solution at a temperature near ordinary temperature, the processing ability of such PGA particles may be insufficient, and it may be impossible to satisfactorily control the shape of the PGA particles, and so the PGA particles may fail to have a particle diameter within a desired range. The low-temperature crystallization temperature ($T_{c1}$) may be controlled by suitably selecting a polymerization degree (weight average molecular weight (Mw)), a molecular weight distribution, and the kind and content of a polymerization component. When no exothermic peak attending on crystallization is detected in the course of the heating process by the differential scanning calorimeter, no low-temperature crystallization temperature ($T_{c1}$) is present in such particles.

On the other hand, the low-temperature crystallization temperature ($T_{c1}$) of the PLA particles according to the present invention is preferably 65 to 135° C., more preferably 70 to 130° C., still more preferably 75 to 125° C., particularly preferably 80 to 120° C.

Quantity ($\Delta H_{Tc1}$) of Heat of Low-Temperature Crystallization:

A feature of the present invention resides in that the degree of a non-crystalline portion of the biodegradable aliphatic polyester particles such as the PGA particles is evaluated by using a quantity ($\Delta H_{Tc1}$) of heat of low-temperature crystallization as an index. That is, in the biodegradable aliphatic polyester particles such as the PGA particles according to the present invention, the quantity ($\Delta H_{Tc1}$) of heat of low-temperature crystallization thereof as calculated out as an exotherm attending on crystallization, which is detected in the course of heating by a differential scanning calorimeter, is at least 1 J/g. Specifically, the quantity ($\Delta H_{Tc1}$) of heat of low-temperature crystallization is calculated out by integrating areas of exothermic peaks [generally, areas within a range of (the low-temperature crystallization temperature ($T_{c1}$)±20° C.)] near the low-temperature crystallization temperature ($T_{c1}$). In biodegradable aliphatic polyester particles such as PGA particles, whose quantity ($\Delta H_{Tc1}$) of heat of low-temperature crystallization is at least 1 J/g, a non-crystalline portion is present in a certain amount or more, and such particles are large in the degree of the non-crystalline portion and can be easily dissolved in an organic solvent at a temperature of (the glass transition temperature of the biodegradable aliphatic polyester contained in the particles−5° C.) or lower, i.e., a temperature near ordinary temperature. If the quantity ($\Delta H_{Tc1}$) of heat of low-temperature crystallization of particles is less than 1 J/g, such biodegradable aliphatic polyester particles such as PGA particles are low in the degree of the non-crystalline portion present therein and high in the degree of a crystalline portion and is difficult to be dissolved in the organic solvent at a temperature near ordinary temperature. Incidentally, when no low-temperature crystallization temperature ($T_{c1}$) is present in particles, the quantity ($\Delta H_{Tc1}$) of heat of low-temperature crystallization is not present in such particles, i.e., 0 J/g.

The quantity ($\Delta H_{Tc1}$) of heat of low-temperature crystallization of the biodegradable aliphatic polyester particles such as the PGA particles according to the present invention is preferably at least 3 J/g, more preferably at least 5 J/g, still more preferably at least 8 J/g, particularly preferably at least 10 J/g, most preferably at least 12 J/g. No particular limitation is imposed on the upper limit of the quantity ($\Delta H_{Tc1}$) of heat of low-temperature crystallization of the biodegradable aliphatic polyester particles such as the PGA particles. When the quantity of heat is too large, however, the solution viscosity of a solution obtained by dissolving such particles in an organic solvent becomes high (exceeding 1,000 mPa·s), and so the handleability of the solution become poor. Accordingly, the upper limit of the quantity of heat is generally at most 50 J/g, often at most 45 J/g and may also be at most 40 J/g.

Quantity (ΔHm) of Heat of Crystal Melting:

In the biodegradable aliphatic polyester particles such as the PGA particles according to the present invention, the quantity (ΔHm) of heat of crystal melting thereof as calculated out as an endotherm attending on melting of a crystal, which is detected in the course of heating by a differential scanning calorimeter, is preferably less than 100 J/g. The quantity (ΔHm) of heat of crystal melting of the PGA particles is more preferably at most 98 J/g, still more preferably at most 95 J/g, particularly preferably at most 90 J/g, most preferably at most 85 J/g. The quantity (ΔHm) of heat of crystal melting is calculated out as an endotherm attending on melting of a crystal, which is detected in the course of heating the sample from −50° C. to a temperature near (the crystalline melting point (Tm)+60° C.) at a heating rate of 20° C./min under a nitrogen atmosphere by means of a differential scanning calorimeter (DSC), and is generally calculated out by integrating areas of all endothermic peaks detected within a range of (the crystalline melting point (Tm)±40° C.).

If the quantity (ΔHm) of heat of crystal melting of biodegradable aliphatic polyester particles such as PGA particles is 100 J/g or more, such particles are poor in low-temperature solubility, and it is thus difficult to obtain a solution thereof at a temperature near ordinary temperature. No particular limitation is imposed on the lower limit of the quantity (ΔHm) of heat of crystal melting. However, the lower limit is generally 20 J/g, often 30 J/g. In the PGA particles in particular, the lower limit is often about 40 J/g.

Difference Between Quantity of Heat of Crystal Melting and Quantity of Heat of Low-Temperature Crystallization:

With respect to the quantity (ΔHm) of heat of crystal melting and the quantity ($\Delta H_{Tc1}$) of heat of low-temperature crystallization, the present invention also features that a heat capacity represented by a difference (hereinafter may referred to as "ΔHm−$\Delta H_{Tc1}$") between the quantity (ΔHm) of heat of crystal melting and the quantity ($\Delta H_{Tc1}$) of heat of low-temperature crystallization is evaluated as an index to the degree of the non-crystalline portion of the biodegradable aliphatic polyester particles such as the PGA particles. That is, in the biodegradable aliphatic polyester particles such as the PGA particles according to the present invention, the difference (ΔHm−$\Delta H_{Tc1}$) between the quantity (ΔHm) of heat of crystal melting and the quantity ($\Delta H_{Tc1}$) of heat of low-temperature crystallization is preferably less than 90 J/g. When the difference ΔHm−$\Delta H_{Tc1}$ of the biodegradable aliphatic polyester particles is less than 90 J/g, the degree of the non-crystalline portion of the particles is high, and so it is easier to dissolve the particles in an organic solvent at a temperature near ordinary temperature so as to obtain a solution, and the viscosity of the resultant solution does not become excessive, so that such a solution is easy to be used in various uses. The difference ΔHm−$\Delta H_{Tc1}$ is more preferably less than 85 J/g, still more preferably less than 83 J/g. No particular limitation is imposed on the lower limit of the difference ΔHm−$\Delta H_{Tc1}$. However, the lower limit is generally 20 J/g, often 25 J/g from the viewpoints of the blocking resistance and handleability of the particles.

3. Organic Solvent Solution of Biodegradable Aliphatic Polyester Particles

The biodegradable aliphatic polyester particles such as the PGA particles according to the present invention are excellent in low-temperature solubility and can be dissolved in an organic solvent at a temperature near ordinary temperature to prepare a solution of the biodegradable aliphatic polyester particles such as the PGA particles. The low-temperature solubility means that the biodegradable aliphatic polyester particles can be dissolved at a concentration of at least 2% by mass in an organic solvent at a temperature not higher than (the glass transition temperature (Tg) of the biodegradable aliphatic polyester contained in the biodegradable aliphatic polyester particles−5° C.) to prepare a solution. The organic solvent solution is desirably a solution in which the particles are dissolved at a concentration of preferably at least 3% by mass, more preferably at least 4% by mass, still more preferably at least 5% by mass.

Organic Solvent:

Example of the organic solvent include ester solvents such as ethyl acetate, butyl acetate, propylene carbonate and 4-butyrolactone; dibasic acid ester solvents such as dimethyl adipate, dimethyl glutarate and dimethyl succinate; ketone solvents such as cyclohexanone, isophorone, methyl ethyl ketone and methyl isobutyl ketone; hydrocarbon solvents such as cyclohexane, toluene, xylene and mesitylene; halogen-containing solvents such as chloroform, dichloromethane, dichloroethane and hexafluoroisopropanol; alcohol solvents such as benzyl alcohol and cyclohexanol; ether solvents such as diisopropyl ether, ethylene glycol monobutyl ether, dipropylene glycol butyl ether, 2-(2-methoxyethoxy) ethanol, bis(2-methoxyethyl)ether, tetrahydrofuran, dioxane and anisole; amide solvents such as formamide, dimethylformamide and dimethylacetamide; pyrrolidone solvents such as N-methyl-2-pyrrolidone; and mixtures thereof. However, the organic solvent is not limited to these solvents.

Preferable organic solvents are a mixed ester solvent of dimethyl adipate, dimethyl glutarate and dimethyl succinate; ether solvents such as diisopropyl ether, ethylene glycol monobutyl ether, dipropylene glycol butyl ether, bis(2-methoxyethyl)ether, tetrahydrofuran, dioxane and anisole; dimethylacetamide; propylene carbonate; 4-butyrolactone; 2-(2-methoxyethoxy)ethanol; and hexafluoroisopropanol, and hexafluoroisopropanol (HFIP) is most preferred.

Dissolution Temperature:

The biodegradable aliphatic polyester particles such as the PGA particles according to the present invention can be dissolved at a concentration of at least 2% by mass in the organic solvent at a temperature not higher than (the glass transition temperature (Tg) of the biodegradable aliphatic polyester contained in the biodegradable aliphatic polyester particles−5° C.) to prepare a solution. The dissolution temperature is preferably not higher than (the glass transition temperature (Tg)−10° C.), more preferably not higher than (the glass transition temperature (Tg)−15° C.). For example, the PGA particles can be dissolved in the organic solvent at a temperature of particularly preferably 30° C. or lower, or the PLA particles can be dissolved in the organic solvent at a temperature of particularly preferably 40° C. or lower, most preferably 35° C. or lower to prepare a solution at a concentration of at least 2% by mass. In particular, such particles may be preferably dissolved in the organic solvent at room temperature (about 20 to 25° C.) to prepare a solution at a concentration of at least 2% by mass.

Concentration of Solution:

The biodegradable aliphatic polyester particles according to the present invention can be dissolved in the organic solvent to prepare a solution at a concentration of at least 2% by mass. The concentration of the biodegradable aliphatic polyester is preferably at least 3% by mass, more preferably at least 4% by mass, still more preferably at least 5% by mass. No particular limitation is imposed on the upper limit of the concentration. However, the upper limit is generally at most 60% by mass, preferably at most 50% by mass because the handling of the resulting solution becomes difficult if the solution viscosity of the solution is too high. A solution in which the concentration of the particles is at most 40% is good in handleability.

Solution Viscosity:

No particular limitation is imposed on the solution viscosity of the solution prepared from the biodegradable aliphatic polyester particles according to the present invention. However, the solution viscosity is preferably within a range of from 10 to 1,000 mPa·s from the viewpoints of flowability and applicability of the solution. The solution viscosity of the solution is a value determined by pouring 2 g of the biodegradable aliphatic polyester particles into 20 ml of HFIP, stirring the resultant mixture for 2 hour while keeping the temperature of the system at 25° C., thereby preparing a solution, and conducting measurement on this solution at a temperature of 25° C. and a shear rate of 20 sec$^{-1}$ by means of an LV type viscometer (Spindle No. SC4-31) manufactured by BROOKFIELD Co. The solution viscosity of the solution is within a range of more preferably from 50 to 800 mPa·s, still more preferably from 100 to 600 mPa·s, particularly preferably from 150 to 500 mPa·s.

4. Production Process of Biodegradable Aliphatic Polyester Particles

No particular limitation is imposed on the production process of the biodegradable aliphatic polyester particles such as the PGA particles or PLA particles according to the present invention so far as biodegradable aliphatic polyester particles having (A) an average particle diameter of 10 to 500 μm and (B) a quantity of heat of low-temperature crystallization of at least 1 J/g can be obtained.

The biodegradable aliphatic polyester particles according to the present invention can be generally obtained by using, as a starting material, a particulate biodegradable aliphatic polyester obtained by, preferably, washing a biodegradable aliphatic polyester such as PGA, which is collected in the form of powder, flake or the like after a polymerization reaction and classifying it as needed. In addition, a biodegradable aliphatic polyester in the form of pellet, which is obtained by incorporating various additives as needed and conducting melt extrusion may be used as the starting material. Such biodegradable aliphatic polyester in the various forms of powder, flake, pellet and the like (i.e., in a particulate form) preferably has a weight average molecular weight of at least 50,000. If the weight average molecular weight of the particulate biodegradable aliphatic polyester is too low, strength may be insufficient in some cases in various products obtained by and uses of the resulting biodegradable aliphatic polyester particles.

Grinding Treatment:

The biodegradable aliphatic polyester particles such as the PGA particles according to the present invention can be produced by apply mechanical impact to the particulate biodegradable aliphatic polyester to grind (impact-grind) it and are preferably produced by grinding the biodegradable aliphatic polyester at a temperature not lower than 0° C. and lower than the glass transition temperature of the biodegradable aliphatic polyester while applying high shearing force. In addition, classification may also be conducted as needed.

A grinding (impact-grinding) temperature at which the grinding treatment is conducted for obtaining the biodegradable aliphatic polyester particles excellent in low-temperature solubility is preferably a temperature not lower than 0° C. and lower than the glass transition temperature of the biodegradable aliphatic polyester, more preferably a temperature from 5° C. or higher to (the glass transition temperature−5° C.) or lower, still more preferably a temperature from 10° C. or higher to (the glass transition temperature−10° C.) or lower, particularly preferably a temperature from 15° C. or higher to (the glass transition temperature−15° C.) or lower. If the grinding temperature is lower than 0° C., it may be difficult in some cases to obtain particles good in low-temperature solubility. If the grinding temperature is not lower than the glass transition temperature of the biodegradable aliphatic polyester on the other hand, the shape of the resulting biodegradable aliphatic polyester particles may become uneven in some cases.

No particular limitation is imposed on an equipment for conducting grinding (impact-grinding) while applying high shearing force so far as the equipment is a grinding machine great in the contribution to impact force and shearing force among grinding actions of compressive force, frictional force, impact force and shearing force. For example, a turbo mill that grinding is conducted by using ultra-high vortex and pressure vibration in addition to impact by a rotor can be effectively utilized.

A grinding treatment by a jet mill that only a high-speed air current is injected from a nozzle, a pin mill that grinding is conducted by impacting the particularly biodegradable aliphatic polyester on pins by centrifugal force, a roll mill that grinding is conducted between a pair of rolls, or the like does not apply high shearing force to the particulate biodegradable aliphatic polyester and may thus fail to obtain biodegradable aliphatic polyester particles good in low-temperature solubility in some cases. However, the turbo mill may be used in combination with the jet mill, pin mill, roll mill or the like.

EXAMPLES

The present invention will hereinafter be described more specifically by the following Examples and Comparative Examples. However, the present invention is not limited to these examples. Measuring methods of physical properties and characteristics or properties of biodegradable aliphatic polyester particles in Examples and Comparative Examples are as follows.

Weight Average Molecular Weight (Mw):

The weight average molecular weight (Mw) was determined by dissolving 10 mg of a sample of biodegradable aliphatic polyester particles in a solution with sodium trifluoroacetate dissolved at a concentration of 5 mM in HFIP to prepare 10 ml of a solution, filtering the solution through a membrane filter to prepare a sample solution, and injecting 10 μl of this sample solution into a gel permeation chromatography (GPC) analyzer to measure a molecular weight under the following conditions.

Conditions for Measurement by GPC:

Apparatus: GPC104 manufactured by Showa Denko K.K.
Column: HFIP-806M manufactured by Showa Denko K.K., two columns (connected in series)+precolumn: HFIP-LG, one column,
Column temperature: 40° C.,
Eluent: HFIP solution with sodium trifluoroacetate dissolved at a concentration of 5 mM,
Detector: Differential refractive index, and
Molecular weight calibration: The data of a calibration curve for molecular weight, which was prepared by using 5 kinds of polymethyl methacrylates (products of Polymer Laboratories Ltd.) having respective standard molecular weights different from one another, was used.

Crystalline Melting Point (Tm) and Glass Transition Temperature (Tg):

A crystalline melting point (Tm) was measured from an endothermic peak which appears when 10 mg of a sample was heated to a temperature near (the crystalline melting point (Tm)+60° C.) at a heating rate of 20° C./min under a nitrogen atmosphere by means of a differential scanning calorimeter (DSC; TC-15 manufactured by Mettler Toledo International Inc.). When a plurality of crystalline melting points (Tm) was observed, a temperature of a peak having the largest peak area was regarded as a crystalline melting point (Tm). On the other hand, an intermediate-point glass transition temperature corresponding to a transition region from a glassy state to a rubbery state when a non-crystalline sample obtained by heating 10 mg of a sample to about 280° C., holding the sample for 2 minutes at this temperature and then quickly (at a rate of about 100° C./min) cooling the sample with liquid nitrogen is reheated from a room temperature atmosphere to a temperature near 100° C. at a heating rate of 20° C./min under a nitrogen atmosphere by means of the differential scanning calorimeter (DSC; TC-15 manufactured by Mettler Toledo International Inc.) is regarded as a glass transition temperature (Tg).

Low-Temperature Crystallization Temperature ($T_{c1}$) and Quantity ($\Delta H_{Tc1}$) of Heat of Low-Temperature Crystallization:

When an exothermic peak attending on crystallization is detected in the course of heating the sample from −50° C. to a temperature near (the crystalline melting point (Tm)+60° C.) at a heating rate of 20° C./min under a nitrogen atmosphere by means of the differential scanning calorimeter, the temperature of that exothermic peak was regarded as a low-temperature crystallization temperature ($T_{c1}$). A quantity ($\Delta H_{Tc1}$) of heat of low-temperature crystallization was calculated out by integrating areas of exothermic peaks within a range of (the low-temperature crystallization temperature ($T_{c1}$)±20° C.).

Quantity ($\Delta Hm$) of Heat of Crystal Melting:

A quantity ($\Delta Hm$) of heat of crystal melting was calculated out by integrating all areas of endothermic peaks detected within a range of (the crystalline melting point (Tm)±40° C.) in the course of a heating process of quickly cooling 10 mg of a sample with liquid nitrogen (at a cooling rate of about 20° C./min) and heating the sample from −50° C. to a temperature near (the crystalline melting point (Tm)+60° C.) at a heating rate of 20° C./min under a nitrogen atmosphere by means of the differential scanning calorimeter.

Average Particle Diameter (50% D):

An average particle diameter was determined by regarding a particle diameter that a cumulative weight from the side of the smallest particle diameter becomes 50% from a particle diameter distribution as to a particle dispersion liquid obtained by dispersing a particle sample in water containing a surfactant ("SN DISPERSANT 7347-c diluted solution", product of SAN NOPCO LIMITED), which was determined by means of a laser diffraction type particle size distribution meter (SALADA-30005, manufactured by Shimadzu Corporation), as an average particle diameter (50% D).

Solution Viscosity:

Two grams of a particle sample was poured into 20 ml of HFIP, and the resultant mixture was stirred for 2 hour while keeping the temperature of the system at 25° C., thereby preparing a solution of the biodegradable aliphatic polyester. Whether the resultant liquid was in a state of a solution or in a state of slurry was visually observed, and a solution viscosity was measured at a temperature of 25° C. and a shear rate of 20 $sec^{-1}$ by means of an LV type viscometer (Spindle No. SC4-31) manufactured by BROOKFIELD Co. when the liquid was a solution.

Example 1

About 10 kg of PGA flake (Mw: 200,000, Tg: 45° C., Tm: 220° C., ΔHm: 100 J/g) was ground 3 times at a feed rate of 10 kg/hr, a grinding temperature of 20° C. and the number of revolutions of 5,000 rpm by means of a turbo mill (TURBO MILL TT250 Model, manufactured by FREUND-TURBO CORPORATION) and then ground 5 times at a feed rate of 1 kg/hr by means of a jet mill (PJM-280SP, manufactured by NIPPON PNEUMATIC MFG. CO., LTD.). Crude powder was removed from the ground product by an ultrasonic vibrating screen having a sieve opening of 39 μm to obtain PGA particles. Two grams of the resultant PGA particles were poured into 20 ml of HFIP and stirred for 2 hours while keeping the temperature of the system at 25° C., thereby preparing a PGA solution. The average particle diameter (50% D) (hereinafter referred to as "particle diameter"), low-temperature crystallization temperature ($T_{c1}$), quantity ($\Delta H_{Tc1}$) of heat of low-temperature crystallization and quantity (ΔHm) of heat of crystal melting of the PGA particles, and the solution viscosity of the solution were measured. The results are shown in Table 1.

Example 2

PGA particles were obtained and a PGA solution was prepared in the same manner as in Example 1 except that the grinding by the jet mill was not conducted, and the sieve opening of the ultrasonic vibrating screen was changed to 154 μm. The particle diameter, low-temperature crystallization temperature ($T_{c1}$), quantity ($\Delta H_{Tc1}$) of heat of low-temperature crystallization and quantity (ΔHm) of heat of crystal melting of the PGA particles, and the solution viscosity of the solution were measured. The results are shown in Table 1.

Example 3

About 10 kg of PGA pellets (Mw: 200,000, Tg: 45° C., Tm: 220° C., ΔHm: 70 J/g) were ground once at a feed rate of 7 kg/hr, a grinding temperature of 20° C. and the number of revolutions of 5,000 rpm by means of a turbo mill (TURBO MILL TT250 Model, manufactured by FREUND-TURBO CORPORATION). Crude powder was removed from the ground product by an ultrasonic vibrating screen having a sieve opening of 154 μm to obtain PGA particles. The resultant PGA particles were used to prepare a PGA solution in the same manner as in Example 1. The particle diameter, low-temperature crystallization temperature ($T_{c1}$), quantity ($\Delta H_{Tc1}$) of heat of low-temperature crystallization and quantity (ΔHm) of heat of crystal melting of the PGA particles, and the solution viscosity of the solution were measured. The results are shown in Table 1.

Example 4

PGA particles were obtained and a PGA solution was prepared in the same manner as in Example 3 except that the number of revolutions of the turbo mill was changed to 4,500 rpm. The particle diameter, low-temperature crystallization temperature ($T_{c1}$), quantity ($\Delta H_{Tc1}$) of heat of low-temperature crystallization and quantity (ΔHm) of heat of crystal melting of the PGA particles, and the solution viscosity of the solution were measured. The results are shown in Table 1.

Comparative Example 1

PGA pellets (Mw: 70,000, Tg: 45° C., Tm: 200° C., ΔHm: 80 J/g) were dissolved in N-methylpyrrolidone at a temperature of 190° C. to prepare a 5% by mass solution of PGA. This solution was cooled at a cooling rate of 2° C./min to deposit PGA particles. The PGA particles were separated by suction filtration and washed with acetone and then dried for 12 hours at a temperature of 40° C. under vacuum. Two grams of the resultant PGA particles were poured into 20 ml of HFIP and stirred for 2 hours while keeping the temperature of the system at 25° C. However, the PGA particles were not dissolved and remained being in a state of a slurry. In the PGA particles, no low-temperature crystallization temperature ($T_{c1}$) was detected [thus, the quantity ($\Delta H_{Tc1}$) of heat of low-temperature crystallization thereof was regarded as 0 J/g], and the flowability thereof was poor. The particle diameter, quantity ($\Delta H_{Tc1}$; regarded as 0 J/g) of heat of low-temperature crystallization and quantity (ΔHm) of heat of crystal melting of the PGA particles were measured. The results are shown in Table 1.

Comparative Example 2

After about 20 kg of the PGA flake used in Example 1 was immersed in liquid nitrogen to cool it, the flake was ground for 2 minutes under conditions of a grinding temperature of −25° C. and a peripheral speed of 187 msec by means of a pin mill (Ultrafine Powder Pin Mill: Contraplex Series; manufactured by Makino Mfg. Co., Ltd.) while cooling with liquid nitrogen, thereby obtaining PGA particles. Two grams of the resultant PGA particles were poured into 20 ml of HFIP and stirred for 2 hours while keeping the temperature of the system at 25° C. However, the PGA particles were not dissolved and remained being in a state of a slurry. In the PGA particles, no low-temperature crystallization temperature ($T_{c1}$) was detected [thus, the quantity ($\Delta H_{Tc1}$) of heat of low-temperature crystallization thereof was regarded as 0 J/g]. The particle diameter, quantity ($\Delta H_{Tc1}$; regarded as 0 J/g) of heat of low-temperature crystallization and quantity (ΔHm) of heat of crystal melting of the PGA particles were measured. The results are shown in Table 1.

Comparative Example 3

PGA particles were obtained in the same manner as in Comparative Example 2 except that about 20 kg of the PGA pellets used in Example 3 were used. Two grams of the resultant PGA particles were poured into 20 ml of HFIP and stirred for 2 hours while keeping the temperature of the system at 25° C. However, the PGA particles were not dissolved and remained being in a state of a slurry. In the PGA particles, no low-temperature crystallization temperature ($T_{c1}$) was detected [thus, the quantity ($\Delta H_{Tc1}$) of heat of low-temperature crystallization thereof was regarded as 0 J/g]. The particle diameter, quantity ($\Delta H_{Tc1}$; regarded as 0 J/g) of heat of low-temperature crystallization and quantity (ΔHm) of heat of crystal melting of the PGA particles were measured. The results are shown in Table 1.

TABLE 1

| | Particulate biodegradable aliphatic polyester | Grinding machine | Grinding temperature (° C.) | Particle diameter (μm) | $T_{c1}$ (° C.) | $\Delta H_{Tc1}$ (J/g) | ΔHm (J/g) | ΔHm − $\Delta H_{Tc1}$ (J/g) | Solution viscosity (mPa·s) |
|---|---|---|---|---|---|---|---|---|---|
| Ex. 1 | PGA flake | Turbo mill 3 times + jet mill 5 times | 20 | 11 | 72 | 16 | 84 | 68 | 277 |
| Ex. 2 | PGA flake | Turbo mill 3 times | 20 | 57 | 75 | 12 | 95 | 82 | 177 |
| Ex. 3 | PGA pellet | Turbo mill once | 20 | 83 | 82 | 31 | 59 | 28 | 430 |
| Ex. 4 | PGA pellet | Turbo mill once | 20 | 123 | 95 | 29 | 63 | 34 | 341 |
| Comp. Ex.. 1 | PGA pellet | Not used (solution method) | — | 8 | — | 0 | 73 | 73 | — |
| Comp. Ex.. 2 | PGA flake | Pin mill | −25 | 57 | — | 0 | 98 | 98 | — |
| Comp. Ex.. 3 | PGA pellet | Pin mill | −25 | 85 | — | 0 | 59 | 59 | — |

It was found from Table 1 that the PGA particles of Examples 1 to 4, which were obtained by grinding the particulate PGA having a weight average molecular weight of 200,000 by means of the turbo mill and had a particle diameter of 11 to 123 μm and a quantity ($\Delta H_{Tc1}$) of heat of low-temperature crystallization of 12 to 31 J/g, can be dissolved in HFIP at 25° C. to provide respective solutions having a solution viscosity of 177 to 430 mPa·s.

On the other hand, it was found that the PGA particles of Comparative Example 1, which were obtained by being deposited from the solution dissolved at the temperature of 190° C. and had a particle diameter of 8 μm, and the PGA particles of Comparative Examples 2 and 3, which were formed by being freeze-ground while cooling with liquid nitrogen without being ground while applying high shearing force, are those whose low-temperature crystallization temperature ($T_{c1}$) was not detected and all cannot be dissolved in HFIP at 25° C. to provide a solution.

INDUSTRIAL APPLICABILITY

According to the present invention, there are provided biodegradable aliphatic polyester particles having the following properties: (A) the average particle diameter thereof is 10 to 500 μm, and (B) the quantity of heat of low-temperature crystallization thereof as calculated out as an exotherm attending on crystallization, which is detected in the course of heating by a differential scanning calorimeter, is at least 1 J/g, and preferably also having the following properties: (C) the quantity of heat of crystal melting thereof as calculated out as an endotherm attending on melting of a crystal, which is detected in the course of heating by the differential scanning calorimeter, is less than 100 J/g, and further (D) a difference between the quantity of heat of crystal melting and the quantity of heat of low-temperature crystallization is less than 90 J/g, said particles being able to be dissolved in an organic solvent at a temperature not higher than (the glass transition temperature of the biodegradable aliphatic polyester−5° C.), i.e., a temperature near ordinary temperature, and being good in handleability, so that the applicability of the biodegradable aliphatic polyester particles can be enhanced, and so the present invention is high in industrial applicability.

According to the present invention, the above-described biodegradable aliphatic polyester particles can be easily obtained by grinding a particular biodegradable aliphatic polyester having a weight average molecular weight of at least 50,000 at a temperature not lower than 0° C. and lower than the glass transition temperature of the biodegradable aliphatic polyester while applying high shearing force, so that the present invention is high in industrial applicability.

The invention claimed is:

1. Biodegradable aliphatic polyester particles, wherein the particles are soluble in an organic solvent at a temperature of 40° C. or lower and wherein:
   (A) a biodegradable aliphatic polyester contained in the biodegradable aliphatic polyester particles is a polyglycolic acid having a weight average molecular weight of from 150,000 to 1,000,000,
   (B) the average particle diameter (50% D) of the particles is 10 to 500 μm,
   (C) the quantity of heat of low-temperature crystallization thereof as calculated out as an exotherm attending on crystallization, which is detected in the course of heating by a differential scanning calorimeter, is at least 1 J/g,
   (D) the quantity of heat of crystal melting thereof as calculated out as an endotherm attending on melting of a crystal, which is detected in the course of heating by the differential scanning calorimeter, is less than 100 J/g,
   (E) the biodegradable aliphatic polyester particles can be dissolved at a concentration of at least 2% by mass in an organic solvent at a temperature not higher than the glass transition temperature (Tg) of the biodegradable aliphatic polyester contained in the biodegradable aliphatic polyester particles−5° C., to prepare a solution, and
   (F) solution viscosity is within a range of from 10 to 1,000 mPa·s, wherein the solution viscosity is determined by pouring 2 g of the biodegradable aliphatic polyester particles into 20 ml of hexafluoroisopropanol, stirring the resultant mixture for 2 hours while keeping the temperature of the system at 25° C., thereby preparing a solution, and conducting measurement on the solution at a temperature of 25° C. and a shear rate of 20 sec$^{-1}$.

2. The biodegradable aliphatic polyester particles according to claim 1, wherein the organic solvent is at least one solvent selected from the group consisting of ester solvent, dibasic acid ester solvent, ketone solvent, hydrocarbon solvent, halogen-containing solvent, alcohol solvent, ether solvent, amide solvent, and pyrrolidone solvent.

3. The biodegradable aliphatic polyester particles according to claim 1, wherein the average particle diameter thereof is 12 to 450 μm.

4. The biodegradable aliphatic polyester particles according to claim 1, wherein the average particle diameter thereof is 20 to 300 μm.

5. The biodegradable aliphatic polyester particles according to claim 1, wherein the average particle diameter thereof is 30 to 200 μm.

6. The biodegradable aliphatic polyester particles according to claim 1, wherein the particles are soluble in an organic solvent at a temperature of 35° C. or lower.

7. The biodegradable aliphatic polyester particles according to claim 1, wherein the particles are soluble in an organic solvent at a temperature of 30° C. or lower.

8. The biodegradable aliphatic polyester particles according to claim 1, wherein the particles are soluble in an organic solvent at a temperature of 20 to 25° C.

9. The biodegradable aliphatic polyester particles according to claim 1, wherein the particles can be dissolved at a concentration of at least 3% by mass in an organic solvent at a temperature not higher than the glass transition temperature (Tg) of the biodegradable aliphatic polyester contained in the biodegradable aliphatic polyester particles−5° C., to prepare a solution.

10. The biodegradable aliphatic polyester particles according to claim 1, wherein the particles can be dissolved at a concentration of at least 4% by mass in an organic solvent at a temperature not higher than the glass transition temperature (Tg) of the biodegradable aliphatic polyester contained in the biodegradable aliphatic polyester particles−5° C., to prepare a solution.

11. The biodegradable aliphatic polyester particles according to claim 1, wherein the particles can be dissolved at a concentration of at least 5% by mass in an organic solvent at a temperature not higher than the glass transition temperature (Tg) of the biodegradable aliphatic polyester contained in the biodegradable aliphatic polyester particles−5° C., to prepare a solution.

12. The biodegradable aliphatic polyester particles according to claim 1, wherein the solution viscosity is within a range of from 50 to 800 mPa·s.

13. The biodegradable aliphatic polyester particles according to claim 1, wherein the solution viscosity is within a range of from 100 to 600 mPa·s.

14. The biodegradable aliphatic polyester particles according to claim 1, wherein the solution viscosity is within a range of from 150 to 500 mPa·s.

15. The biodegradable aliphatic polyester particles according to claim 1, wherein (G) a difference between the quantity of heat of crystal melting and the quantity of heat of low-temperature crystallization is less than 90 J/g.

16. A process for producing the biodegradable aliphatic polyester particles according to claim 1, which comprises grinding a particular biodegradable aliphatic polyester containing a polyglycolic acid at a temperature not lower than 0° C. and lower than the glass transition temperature of the biodegradable aliphatic polyester while applying high shearing force.

* * * * *